Aug. 22, 1967 J. W. ADELT 3,336,842
HYDRAULIC ACTUATOR
Filed Aug. 19, 1965

INVENTOR:
JOSEPH W. ADELT,
BY Kingsland, Rogers, Ezell, Eilers & Robbins
ATTORNEYS

United States Patent Office 3,336,842
Patented Aug. 22, 1967

3,336,842
HYDRAULIC ACTUATOR
Joseph W. Adelt, Chicago, Ill., assignor to Echlin Manufacturing Company, Branford, Conn., a corporation of Connecticut
Filed Aug. 19, 1965, Ser. No. 480,973
5 Claims. (Cl. 92—75)

This invention relates to a hydraulic actuator such as is used in a vehicle brake system. The hydraulic actuator has a piston member in a cylinder. The piston member slides in one direction against an external force when hydraulic fluid is forced into the cylinder. When the hydraulic fluid pressure is relieved, the external force returns the piston member. A cup is pressed against the face of the piston member by a compression spring. The purpose of the cup is to act as a seal against leakage of the hydraulic fluid past the piston member, and for this purpose, the cup has an annular lip or flange which is pressed or expanded against the cylinder wall by an expander means. This invention is directed particularly to the design of a spring that operates both as the compression spring to hold the cup against the face of the piston member and as the expander to hold the annular lip of the flange against the cylinder wall.

The requirements of the compression spring and the expander means are rather exact for a hydraulic actuator of the kind described herein. As the piston reciprocates, the compression spring must be sufficiently strong to hold the cup against the face of the piston member. The expander means must maintain uniform pressure against the annular flange of the cup with a force that will seal against leakage while permitting the flange to slide as the cup reciprocates with the piston member. It is common in present day hydraulic actuators to use a separate element for the expander, if an expander is used. However, since the conventional separate expander does not function satisfactorily in the view of some manufacturers, an expander is not always used.

This invention is applicable to hydraulic actuators having either two opposed piston members or only one piston member in one end of the cylinder. The invention is particularly directed to the formation of a spring that acts as both the biasing spring and as an expander for each cup flange. In particular, the spring is made with a main body that has the conventional coiling normally found in compression springs. The ends of the spring are formed by three or four turns in a compact group of progressively decreasing diameter. The annular flange of the cup is tapered to a thinner thickness at its outer edge, and the tapered ends of the spring formed by the turns of decreasing diameter complement the shape of the cup and press the annular flange against the wall of the cylinder. The diameters of these tapered turns are such that the end turns fit into the cup and bear against the flange of the cup to press the flange against the side wall of the cylinder. This pressure provides a good seal against the escape of hydraulic fluid past the flange of the cup.

Another feature of the spring is that its major diameter is only slightly less than the diameter of the cylinder. Therefore, assembly of the unit, which is already made simpler by the elimination of separate expander parts, is further facilitated because the spring is self-centering within the cylinder and within the cup when the spring is dropped into the cylinder.

The principal object of this invention is to provide a hydraulic actuator having one or two reciprocable pistons and having a cup against the face of each piston, with a helical spring having one or two tapered coiled ends corresponding to the one or two pistons for pressing the cups against the piston faces and for expanding the flanges.

Another object of the invention is to provide a hydraulic actuator having movable piston elements with flexible and resilient cups seated against the piston elements to act as seals against the escape of hydraulic fluid, and with a coil spring mounted to hold the two cups against their respective piston elements, the spring having tapered turns at its ends for seating in the cups to act as expanders therefor.

An important object of the invention is to provide a single unit compression and expander spring which enables use of standard-flare cups designed to meet SAE specifications.

Another object of the invention is to provide the foregoing actuator wherein the diameter of the spring is only slightly less than the diameter of the cylinder and is automatically correctly positioned when dropped into the cylinder.

Another object of the invention is to provide a single unit compression spring and expander spring which performs the necessary and desired function of maintaining a fluid seal in spite of minor imperfections and rough bore conditions which might exist in the cylinder.

Another object is to provide a single unit compression and expander spring which, because it maintains pressure on the cup walls and prevents collapse of the cup, will prevent the entrance of air into the hydraulic system during contraction of the fluid which occurs under certain atmospheric conditions when the brake fluid cools.

Other objects and advantages will appear.

Figure 1:
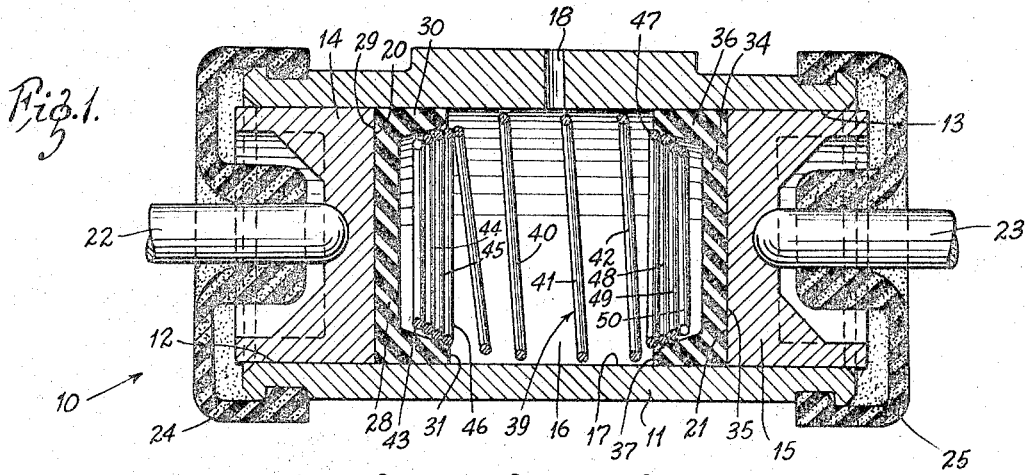
FIGURE 1 is a view in longitudinal medial section through a hydraulic actuator having two piston members.

Referring to FIGURE 1 the hydraulic actuator 10 shown there comprises a cylinder 11 having open ends 12 and 13. Two piston members 14 and 15 are slidable within the cylinder 11 near the ends 12 and 13. A hydraulic chamber 16 is therefore defined within the inner wall 17 of the cylinder 11 and between the piston members 14 and 15. There is an inlet 18 through the side of the cylinder 11, adapted to be connected to a source of hydraulic fluid (not shown) to supply hydraulic fluid to the chamber 16.

As is conventional, the piston members 14 and 15 have opposing faces 20 and 21, respectively. Also, there are rods 22 and 23 which are subjected to a constant biasing force tending to move the piston members 14 and 15 toward one another. When the actuator 10 is a wheel cylinder for vehicle brakes, the biasing force supplied to the rods 22 and 23 is that produced by the return springs on wheel brake shoes, and this biasing force is strong enough to move the piston members toward one another unless fluid is forced through the port 18 to the chamber 16 from an external source (not shown) such as a brake master cylinder. It is normal to have rubber dust boots 24 and 25 on opposite ends of the cylinder 11.

A cup member 28 is positioned with its base 29 against the face 20 of the piston 14. The cup has an annular lip or flange 30 which has a gradually tapered wall of decreasing thickness toward the edge 31 of the flange 30.

Another similar cup 34 is positioned with its base 35 bearing against the face 21 of the piston 15 and with the lip or flange 36 bearing against the side wall of the cylinder 11. The lip or flange 36 is tapered toward its edge 37.

Figure 2:
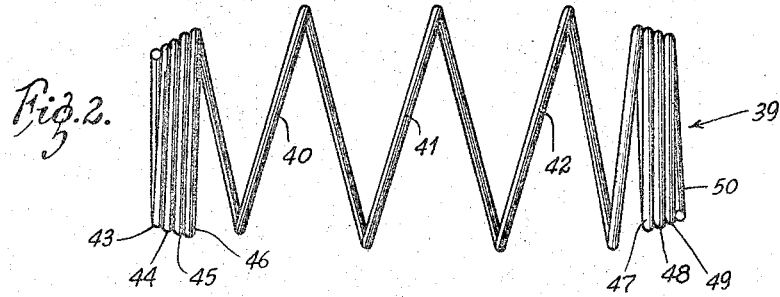
FIGURE 2 is a side elevation view of the biasing and expander spring removed from the hydraulic cylinder of FIGURE 1 and shown in uncompressed condition.

A compression spring 39 performs the dual function of holding the cups 28 and 34 against their respective piston faces and of acting as the expander for the flanges of the cups. For this purpose, the spring 39, as shown in FIGURE 2, has a main body section having the usual helix formed by a plurality of turns 40, 41, and 42 which are spaced from one another, as shown. At one end of the spring 39, there are a plurality of compact turns 43, 44, 45, and 46, and at the other end, another plurality of compact turns 47, 48, 49, and 50. The turns 43–46 are wound close to and preferably in contact with one another. Likewise, the turns 47–50 are preferably in contact with one another. Furthermore, the diameters of the turns 43–46 are gradually decreasing toward the extreme end turn 43 and the diameters of the turns 47–50 are gradually decreasing toward the extreme end turn 50.

As FIGURE 1 clearly shows, the tapered form of the flanges 30 and 36 causes the recesses defined by the flanges to be of gradually decreasing diameters toward the bases 29 and 35 of the cups. The turns 43–46 and 47–50 of the spring 39 fit into the cups 28 and 34, as shown in FIGURE 1, and press against the flanges 30 and 36.

Figure 3:
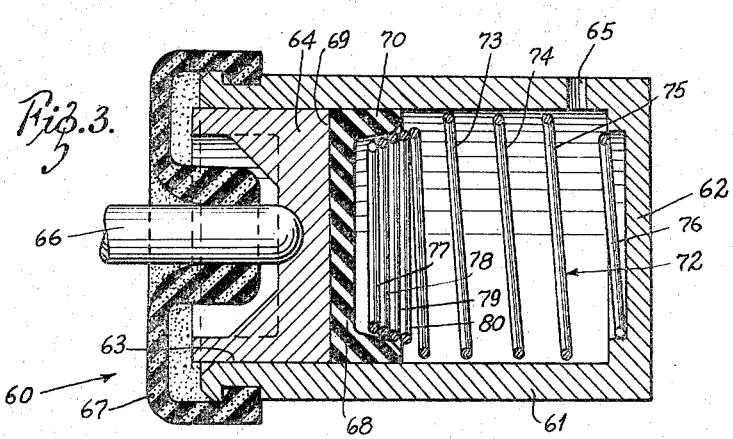
FIGURE 3 is a view in longitudinal medial section through another hydraulic actuator having only a single piston member.
Figure 4:
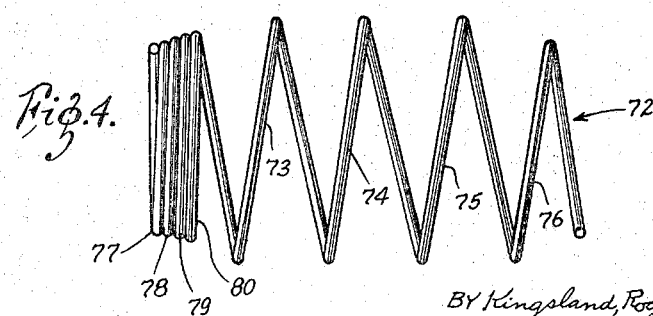
FIGURE 4 is a side elevation view of an expander and biasing spring for the actuator of FIGURE 3, removed from the cylinder and in uncompressed condition.

FIGURES 3 and 4 show how the concepts of this invention are incorporated into a hydraulic actuator having only one operating end. This actuator 60 comprises a cylinder 61 having a closed end 62 and an open end 63. A piston member 64 is slidable within the cylinder adjacent the open end 63. There is a port 65 adapted to be connected to a source of hydraulic fluid (not shown) for moving the piston member 64 against a plunger 66. A boot 67 fits over the end of the cylinder in the usual manner.

A cup 68 is positioned against the face 69 of the piston 64 and the annular rim or flange 70 of the cup bears against the side wall of the cylinder.

The compression spring 72 has a plurality of turns 73, 74, 75, and 76 that are spaced from one another and a plurality of turns 77, 78, 79, and 80 that are positioned adjacent one another or in contact with one another.

The spring 39 and the spring 72 are self-aligning in their respective cylinders because the diameters of the springs are only slightly less than the diameters of the cylinders 17 and 63. This, with the elimination of the separate expander element, greatly facilitates assembly. Also, the cost of manufacturing and packaging is reduced by the elimination of parts.

A particular advantage of this invention is that the design of the spring 39 and the spring 72 permits the use of standard-flare cups designed to meet SAE Residual Flare Specifications 60R2. This contrast with use of the conventional solid metal expander which requires a low lip diameter cup to overcome mechanical sizing of the cup between the expander and the cylinder wall. Because of this low lip diameter design, such cups cannot meet the SAE specifications. The flexibility of the present expander spring permits use of full size cups that do meet this SAE requirement.

Various changes and modifications may be made within the purview of this invention as will be readily apparent to those skilled in the art. Such changes and modifications are within the scope and teaching of this invention as defined by the claims appended thereto.

What is claimed is:

1. A hydraulic actuator comprising a cylinder having an inner cylindrical side wall and at least one open end, a piston member slidable in the open end and having a face defining a side of a fluid chamber within the cylinder, means to admit and exhaust hydraulic fluid into and from the chamber, a cup having a base positioned against the face of the piston and an annular flange positioned against and adapted to slide along the inner cylindrical side wall, the annular flange having an outer wall and an inner wall, the inner wall being of outwardly flared shape by virtue of a gradually increasing diameter in a direction away from the base, and a compression spring continuously positioned and compressed between the cup and the end of the chamber opposite thereto, the spring having a main body with a plurality of body turns forming a helix, the diameters of the body turns being less than the diameter of the inner cylindrical side wall and being greater than the smallest diameter of the inner wall of the annular flange, at least one end of the spring being defined by a plurality of end turns much closer to one another than the main body turns, the end turns being positioned radially inwardly of the flange of the cup, the diameetrs of the end turns being progressively reduced in a direction toward the base of the cup, the plurality of end turns thereby defining a composite tapered annular wall complementary to the outwardly flared shape of the inner wall of the flange, the end turns bearing against the inner wall of the annular flange of the cup to press the flange against the inner cylindrical side wall, whereby the spring simultaneously biases the cup and piston in a direction toward the said one open end and biases the annular flange of the cup against the inner cylindrical side wall of the cylinder.

2. The hydraulic actuator of claim 1 wherein the diameter of the main body portion of the spring is only slightly less than the diameter of the inner cylindrical side wall.

3. The hydraulic actuator of claim 1 wherein the end turns are in contact with one another and comprise at least three turns.

4. A hydraulic actuator comprising a cylinder having an inner wall and opposing ends at least one of which is open, a piston slidable within the open end, a cup having a base against the piston and an annular flange against the inner wall, the annular flange of the cup having an inner wall of gradually increasing diameter in a direction away from the base of the cup, a compression spring for continuously pressing the base of the cup against the piston and for acting as an expander to hold the annular flange against the inner wall, the spring having a plurality of turns adjacent one end of the spring positioned within the cup, the turns within the cup being in contact with one another and being of gradually decreasing diameter toward the base of the cup, the diameters of the turns within the cup being in contact with the annular flange to maintain pressure against the annular flange, and means to admit hydraulic fluid to the interior of the cylinder on the cup side of the cylinder.

5. The hydraulic actuator of claim 4 wherein the other end of the cylinder is open, a second piston slidable within the said other end, a second cup having a base against the second piston and an annular flange against the inner wall, a second plurality of turns adjacent the other end of the spring positioned within the second cup, the second plurality of turns being in contact with one another and in contact with the annular flange of the second cup, the annular flange of the second cup being of gradually increasing diameter in a direction away from the base of the second cup, and the second plurality of end turns being of gradually decreasing diameter in a direction toward the base of the second cup.

References Cited

UNITED STATES PATENTS

| 1,548,905 | 8/1925 | Schon | 267—60 |
| 2,093,062 | 9/1937 | Watson | 92—135 |
| 2,116,012 | 5/1938 | Busha | 267—1 |
| 2,483,313 | 9/1949 | Du Bois | 92—75 X |
| 2,865,695 | 12/1958 | Mazeika | 92—135 |

FOREIGN PATENTS

| 1,069,215 | 2/1954 | France. |
| 540,729 | 12/1931 | Germany. |

MARTIN P. SCHWADRON, *Primary Examiner.*

I. C. COHEN, *Assistant Examiner.*